United States Patent
Kawai

(10) Patent No.: US 10,028,312 B2
(45) Date of Patent: Jul. 17, 2018

(54) COMMUNICATION APPARATUS, CONTROL METHOD THEREOF, AND STORAGE MEDIUM

(71) Applicant: CANON KABUSHIKI KAISHA, Tokyo (JP)

(72) Inventor: Yuji Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/250,544

(22) Filed: Aug. 29, 2016

(65) Prior Publication Data
US 2017/0078864 A1 Mar. 16, 2017

(30) Foreign Application Priority Data
Sep. 15, 2015 (JP) .................. 2015-182223

(51) Int. Cl.
| | |
|---|---|
| *H04B 5/00* | (2006.01) |
| *H04B 7/00* | (2006.01) |
| *H04W 76/02* | (2009.01) |
| *H04W 4/06* | (2009.01) |
| *H04W 76/14* | (2018.01) |
| *H04M 1/725* | (2006.01) |

(52) U.S. Cl.
CPC ............ *H04W 76/023* (2013.01); *H04W 4/06* (2013.01); *H04W 76/14* (2018.02); *H04M 1/7253* (2013.01)

(58) Field of Classification Search
CPC ................................................... H04W 8/005
USPC ........................................ 455/41.2, 566, 567
See application file for complete search history.

(56) References Cited

U.S. PATENT DOCUMENTS

| | | | | |
|---|---|---|---|---|
| 6,980,213 | B1* | 12/2005 | Hirose | H04M 1/72519 340/7.5 |
| 7,440,749 | B2* | 10/2008 | Muto | G06Q 30/02 455/406 |
| 8,874,173 | B2* | 10/2014 | Shigeta | H04M 1/72519 358/1.15 |
| 2002/0142751 | A1* | 10/2002 | Abe | G06Q 20/3437 455/406 |
| 2008/0194205 | A1* | 8/2008 | Kusakari | B41J 29/393 455/67.7 |

(Continued)

FOREIGN PATENT DOCUMENTS

JP 2011-101231 5/2011

*Primary Examiner* — Tilahun B Gesesse
(74) *Attorney, Agent, or Firm* — Fitzpatrick, Cella, Harper & Scinto

(57) ABSTRACT

A communication apparatus comprises: a communication unit configured to communicate with external communication apparatuses; a storage unit configured to store history information related to an external communication apparatus with which connection has been established in the past; and a display control unit configured to, during display for selection of an external communication apparatus, display information indicating one or more services provided by the external communication apparatuses, wherein the communication unit receives information related to the services provided by the external communication apparatuses, and based on the received information related to the services provided by the external communication apparatuses and on the history information, the display control unit changes a display appearance used in displaying the information indicating one or more services provided by the external communication apparatuses.

19 Claims, 8 Drawing Sheets

(56) References Cited

U.S. PATENT DOCUMENTS

| | | | | |
|---|---|---|---|---|
| 2011/0124286 A1* | 5/2011 | Tanaka | ................ | H04W 76/023 455/41.1 |
| 2012/0075485 A1* | 3/2012 | Mizutani | ............. | H04M 1/7253 348/207.1 |
| 2013/0346872 A1* | 12/2013 | Scott | ..................... | G06F 3/0237 715/738 |
| 2014/0099935 A1* | 4/2014 | Han | ..................... | H04W 48/16 455/418 |

* cited by examiner

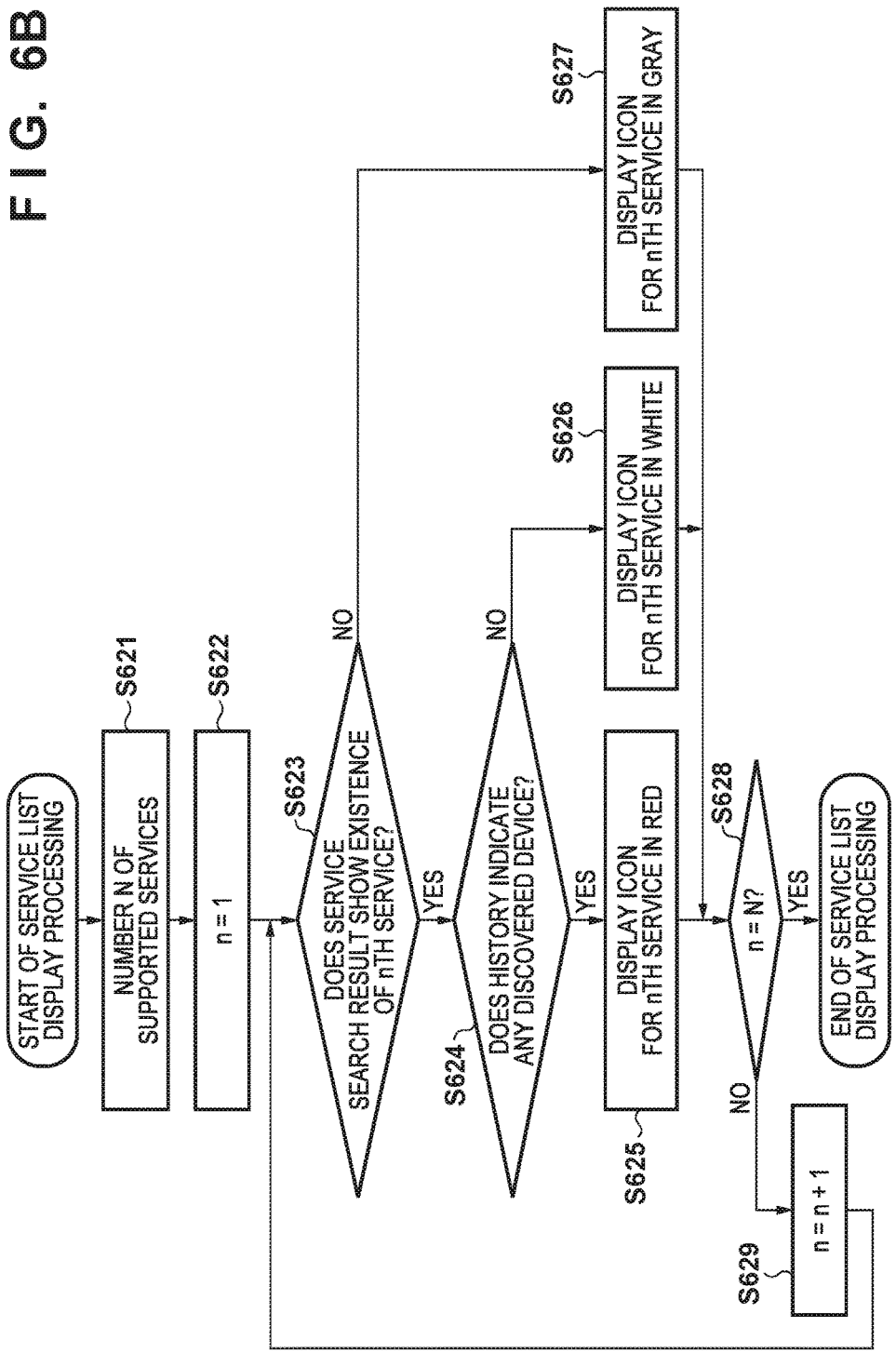

COMMUNICATION APPARATUS, CONTROL METHOD THEREOF, AND STORAGE MEDIUM

BACKGROUND OF THE INVENTION

Field of the Invention

The present invention relates to a communication apparatus, a control method thereof, and a storage medium.

Description of the Related Art

In recent years, a wireless communication function is provided not only in mobile personal computers (so-called notebook PCs), but also in various other apparatuses including printers, mobile information terminals, digital cameras, mobile telephones, and smartphones. Especially, an increase in apparatuses that comply with such standards as Wi-Fi Direct® and Bluetooth® has made inter-apparatus connection easier. For example, Wi-Fi Direct enables apparatuses to operate as wireless LAN access points or wireless LAN stations, and thus does not require access points to be prepared separately; this has made inter-apparatus connection easier.

With an increase in peripheral apparatuses that are capable of wireless communication, it becomes necessary to search for a connection partner from a list of many apparatuses with communication capabilities, and selection of a desired apparatus becomes no longer easy. In view of this, Japanese Patent Laid-Open No. 2011-101231 suggests a technique to facilitate selection of an apparatus serving as a connection destination when Bluetooth® is used, by searching for peripheral apparatuses capable of wireless communication and reordering the searched apparatuses in a list based on the strengths of signals received from the searched apparatuses (in ascending order of distances to the searched apparatuses).

Meanwhile, if the services provided by peripheral apparatuses can be specified, an apparatus search can be made based on the services, that is to say, a more efficient apparatus search/selection can be made. Wi-Fi Direct provides a function of searching for the services provided by peripheral apparatuses (a service discovery function) as an optional function, and thus enables acquisition of information of the services provided by peripheral apparatuses before executing processing for connecting to individual apparatuses.

However, it is assumed that, even in a case where an apparatus serving as a connection destination is selected using such a service discovery function, the selection becomes no longer easy with an increase in the number of apparatuses that support similar services. Furthermore, for example, apparatuses that provide services of the same type, such as print services, may offer different levels of user-friendliness pertaining to the print services. In view of this, improved convenience can be offered to a user if the user can easily select a desired apparatus, for example, an apparatus that the user is familiar with or an apparatus that the user has used before, from among apparatuses that provide a predetermined service. Furthermore, it is assumed that improved convenience can be offered similarly if the services provided by peripheral connectable apparatuses can be easily grasped.

SUMMARY OF THE INVENTION

The present invention has been made in consideration of the aforementioned problems, and realizes a technique that enables easy selection of an apparatus that provides a desired service in accordance with a usage pattern of a user.

In order to solve the aforementioned problems, one aspect of the present invention provides a communication apparatus comprising: a communication unit configured to communicate with external communication apparatuses; a storage unit configured to store history information related to an external communication apparatus with which connection has been established in the past; and a display control unit configured to, during display for selection of an external communication apparatus that serves as a connection partner, display information indicating one or more services provided by the external communication apparatuses, wherein the communication unit receives information related to the services provided by the external communication apparatuses, and based on the received information related to the services provided by the external communication apparatuses and on the history information, the display control unit changes a display appearance used in displaying the information indicating one or more services provided by the external communication apparatuses.

Another aspect of the present invention provides a control method of a communication apparatus, the control method comprising: communicating with external communication apparatuses; storing history information related to an external communication apparatus with which connection has been established in the past; and during display for selection of an external communication apparatus that serves as a connection partner, displaying information indicating one or more services provided by the external communication apparatuses, wherein in the communicating, information related to the services provided by the external communication apparatuses is received, and in the displaying, based on the received information related to the services provided by the external communication apparatuses and on the history information, a display appearance used in displaying the information indicating one or more services provided by the external communication apparatuses is changed.

Still another aspect of the present invention provides a non-transitory computer-readable storage medium storing a computer program, for causing a computer to function as a communication processing apparatus, the computer program comprising: a code to cause a communication unit to communicate with external communication apparatuses, a code to cause a storage unit to store history information related to an external communication apparatus with which connection has been established in the past; and a code to cause a display control unit to, during display for selection of an external communication apparatus that serves as a connection partner, display information indicating one or more services provided by the external communication apparatuses, wherein the code to cause the storage unit to store receives information related to the services provided by the external communication apparatuses, and based on the received information related to the services provided by the external communication apparatuses and on the history information, the code to cause the display control unit to display changes a display appearance used in displaying the information indicating one or more services provided by the external communication apparatuses.

According to the present invention, an apparatus that provides a desired service can be easily selected in accordance with a usage pattern of a user.

Further features of the present invention will become apparent from the following description of an exemplary embodiment (with reference to the attached drawings).

BRIEF DESCRIPTION OF THE DRAWINGS

The accompanying drawings, which are incorporated in and constitute a part of the specification, illustrate an embodiment of the invention, and together with the description, serve to explain the principles of the invention.

FIG. 6B is a flowchart of a sequence of operations pertaining to service list display processing according to the embodiment.

DESCRIPTION OF THE EMBODIMENTS

Figure 1:
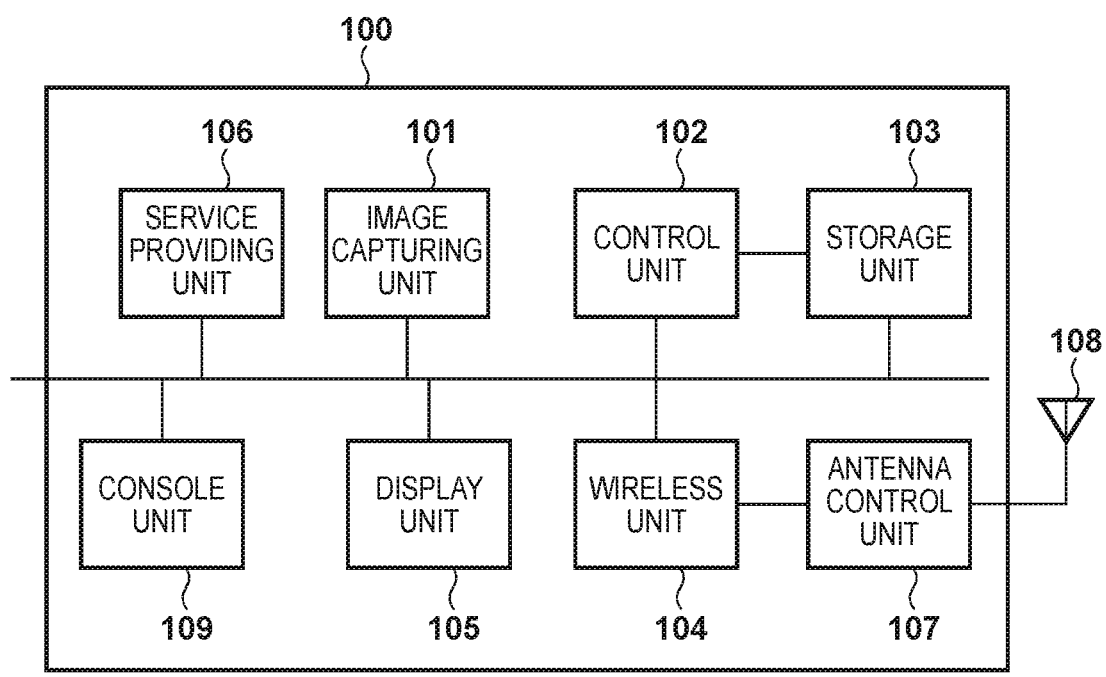
FIG. 1 is a block diagram showing an exemplary functional configuration of a digital camera, which is an example of a communication apparatus according to an embodiment of the present invention.

The following describes an exemplary embodiment of the present invention in detail with reference to the drawings. Note that in the following description, the present invention is exemplarily applied to an arbitrary digital camera capable of acquiring service information that can be provided by other apparatuses, and the digital camera is used as an example of a communication apparatus. Note that the present invention is not limited to being applied to a digital camera, and is applicable to any apparatus capable of acquiring service information that can be provided by other apparatuses. Examples of such an apparatus include a mobile telephone device, a game console, a tablet terminal, a personal computer, a timepiece-type or an eyeglass-type information terminal, a vehicle-mounted device, and a medical device.

Furthermore, in the following description, a wireless LAN system that complies with the IEEE 802.11 series is used. Note that a communication mode is not necessarily limited to a wireless LAN that complies with the IEEE 802.11, and it is possible to use other communication modes utilizing, for example, Bluetooth®, Zigbee®, or a variation thereof.

<Configuration of Digital Camera 100>

A control unit 102 includes one or more processors, such as CPUs and MPUs, and controls an entirety of a digital camera 100 by deploying a control program stored in a storage unit 103 to a RAM working area included in the storage unit 103 and executing the deployed control program. For example, in processing for connecting to another apparatus (hereinafter, an apparatus with a communication function may be simply referred to as a communication apparatus), the control unit 102 controls settings of necessary communication parameters and performs later-described display control with respect to a display unit 105.

The storage unit 103 includes various memories, such as a ROM, a RAM, an HDD, and a flash memory, and stores the control program executed by the control unit 102 and various types of information, such as communication parameters. The storage unit 103 also stores image data and files that have been either acquired through image capture performed by an image capturing unit 101, or received from an external communication apparatus.

A wireless unit 104 includes a communication circuit or a communication module, and performs wireless LAN communication in compliance with, for example, the IEEE 802.11 series. For example, the display unit 105 includes a display panel such as an LCD or an LED, as well as a speaker or a similar audio output device, and outputs at least one of information that can be perceived visually and information that can be perceived as a sound.

A service providing unit 106 includes a module for providing services at an application layer in a corresponding communication apparatus; it provides, for example, an image capturing function in the digital camera 100.

An antenna control unit 107 includes a control circuit or a control module, and controls transmission and reception of signals via wireless communication by controlling an antenna 108. A console unit 109 includes, for example, various buttons and a touchscreen, detects an input operation performed by a user, and notifies the control unit 102 of the detected user operation. The control unit 102 controls various components of the digital camera 100, such as the wireless unit 104, in accordance with the content of the notification from the console unit 109.

<Configuration of Software Related to Communication Control Function of Digital Camera 100>

A description is now given of an example of a functional configuration of software related to a later-described communication control function with reference to FIG. 2. The communication control function of function blocks 201 is realized by hardware and software provided in the digital camera 100.

A discovery control unit 202 executes device discovery processing for searching for a communication apparatus serving as a communication partner. A GO Negotiation control unit 203 executes GO Negotiation processing based on the specifications of Wi-Fi Direct protocols to determine which one of the digital camera 100 and an external communication apparatus plays a role of a wireless LAN access point (or a wireless LAN station). According to Wi-Fi Direct, a communication apparatus that provides a wireless LAN access point function is called a P2P group owner (hereinafter also referred to as a GO), whereas a communication apparatus that provides a wireless LAN station function is called a P2P client (hereinafter also referred to as a CL). When the digital camera 100 is a GO or a wireless LAN access point, a later-described wireless LAN access point function control unit 211 is activated. On the other hand, when the digital camera 100 is a CL or a wireless LAN station, a later-described wireless LAN station function control unit 210 is activated. As protocols related to this GO Negotiation processing are defined by the Wi-Fi Direct specification, a detailed description thereof will be omitted. According to Wi-Fi Direct, a network formed by a GO is called a P2P group. A network of the same meaning may be referred to as a P2P group. Furthermore, a P2P group owner (GO), a P2P client (CL), and a group of communication apparatuses whose roles have not been determined yet are collectively referred to as P2P devices.

A DHCP client control unit 204 provides a DHCP client function, and is activated when the GO Negotiation control unit 203 has determined that the digital camera 100 plays a role of a wireless LAN station. A DHCP server control unit 205 provides a DHCP server function, and is activated when the GO Negotiation control unit 203 has determined that the digital camera 100 plays a role of a wireless LAN access point.

A WPS enrollee control unit 206 receives communication parameters that are necessary for wireless LAN communication from another WPS registrar apparatus. It operates when the digital camera 100 plays a role of a wireless LAN station, similarly to the DHCP client control unit 204. A WPS registrar control unit 207 provides communication parameters that are necessary for wireless LAN communication to another WPS enrollee apparatus. It operates when the digital camera 100 plays a role of a wireless LAN access point, similarly to the DHCP server control unit 205. Note that communication parameters provided by a WPS registrar are parameters related to, for example, an SSID serving as a network identifier, an encryption key, an encryption method, an authentication key, and an authentication method.

A wireless LAN packet reception unit 208 and a wireless LAN packet transmission unit 209 receive and transmit various packets, including upper layer communication protocols. When the digital camera 100 operates as a wireless LAN station, the wireless LAN station function control unit 210 executes authentication processing, encryption processing, and the like to join a wireless network formed by an apparatus operating as a wireless LAN access point.

When the digital camera 100 operates as a wireless LAN access point, the wireless LAN access point function control unit 211 forms a wireless network and executes, for example, authentication processing, encryption processing, and processing for managing an external communication apparatus. One of the wireless LAN station function control unit 210 and the wireless LAN access point function control unit 211 may operate, or both of them may operate simultaneously.

When the wireless LAN access point function control unit 211 is in operation, a packet routing control unit 212 sends communication packets through bridging and routing.

A data storage unit 213 stores software programs, wireless LAN parameters, and various tables, such as a DHCP address table and an ARP table.

A service discovery control unit 214 realizes a service discovery function, which is unique to Wi-Fi Direct. With the service discovery function, information of services provided by an external communication apparatus is acquired through transmission and reception of an action frame that constitutes a management frame as defined by IEEE 802.11u. Specifically, the service discovery control unit 214 transmits an SD Query, which is a service search signal for searching for services provided by an external communication apparatus, and receives an SD Response, which is a detection response signal, as a response. Alternatively, the service discovery control unit 214 receives an SD Query from an external communication apparatus, and transmits an SD Response as a response.

A P2P Invitation control unit 215 controls an Invitation function defined by the Wi-Fi Direct standard. The Invitation function causes a GO or a CL to prompt a P2P device whose role has not been determined yet to connect as a P2P client; as the Invitation function is defined by the Wi-Fi Direct specification, a description thereof will be omitted.

An application layer service providing unit 216 provides services at an application layer. An application layer denotes a service providing layer that serves as an upper layer, specifically, layer 5 or higher, in the OSI Reference Model. For example, the application layer service providing unit 216 provides a print function (a print service), an image streaming function (an image streaming service), and a file transfer function (a file transfer service).

An application layer service using unit 217 uses the services provided by a service providing unit at an application layer of an external communication apparatus. That is to say, it controls a function of transmitting a print item to a print service providing apparatus, a function of transmitting moving images to a digital display, and so on.

Figure 2:
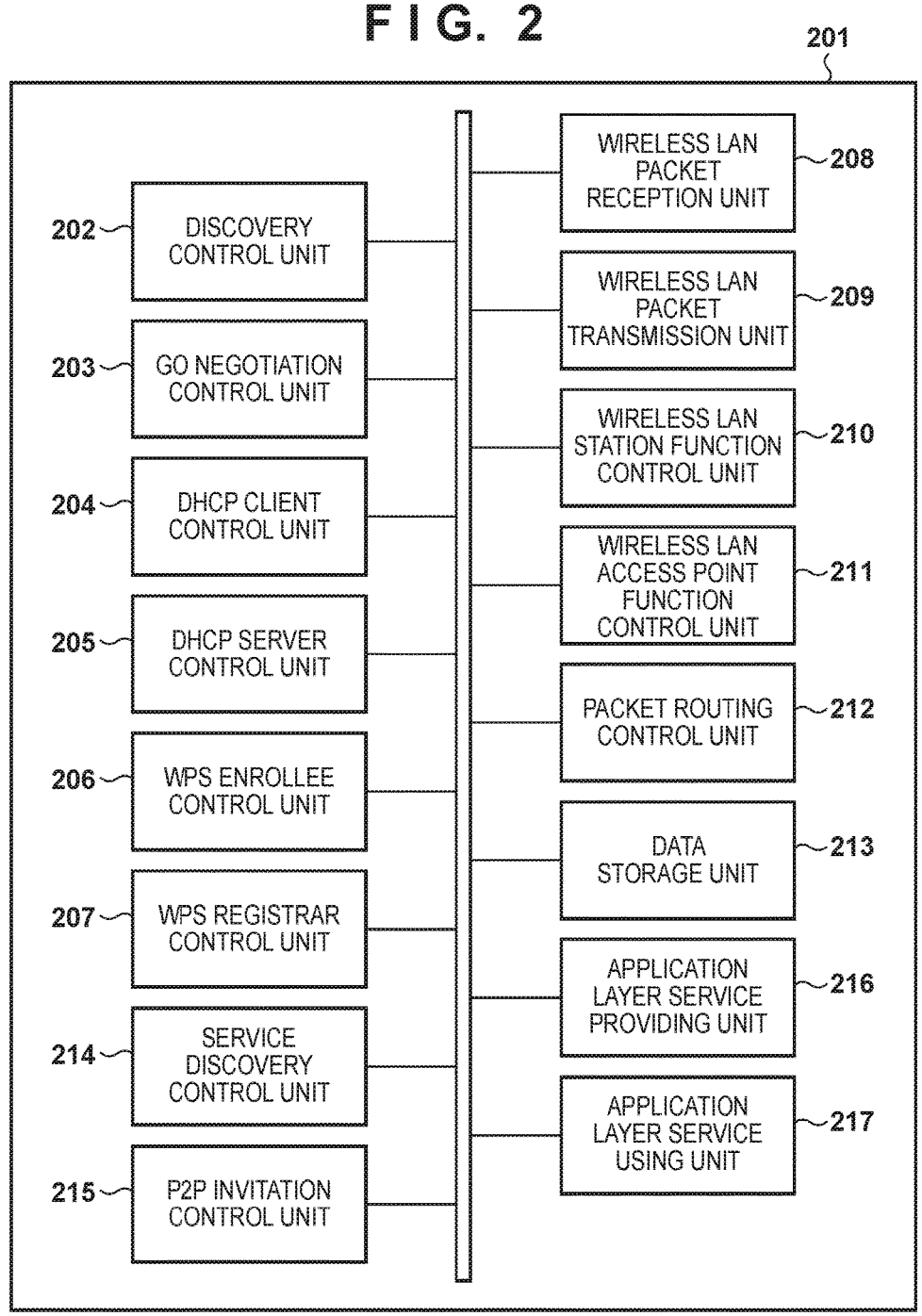
FIG. 2 is a block diagram showing an exemplary functional configuration of software in the digital camera according to the embodiment.

Note that all of the function blocks shown in FIG. 2 are not limited to being provided by software, and may be provided by hardware. Furthermore, the function blocks shown in FIG. 2 are interrelated. Moreover, the function blocks shown in FIG. 2 serve as examples; among these, multiple function blocks may constitute one function block, and any function block may be further divided into blocks that fulfill multiple functions.

In one example of the present embodiment, an apparatus that uses services may be the digital camera 100, whereas an apparatus that provides services may be, for example, a smartphone, a tablet, a digital camera, or a storage apparatus.

<Network Configuration>

Figure 3:
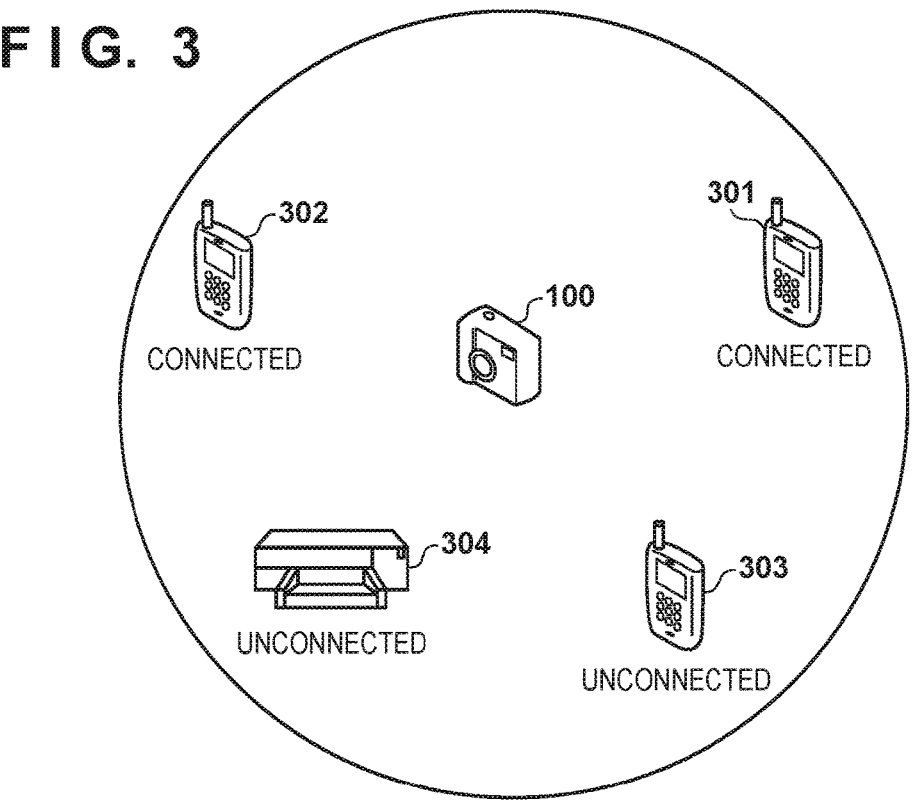
FIG. 3 shows an exemplary network configuration according to the embodiment.

A description is now given of an exemplary network configuration of the present embodiment with reference to FIG. 3. An exemplary network shown in FIG. 3 is composed of the following apparatuses: the digital camera 100, smartphones 301, 302, and 303, and a printer 304. The smartphones 301, 302, and 303 and the printer 304 are present in a communication range in which the digital camera 100 can perform communication. All of these apparatuses have the configurations described earlier with reference to FIGS. 1 and 2. It will be assumed that the smartphones 301 and 302 have connected to the digital camera 100 in the past, and the smartphone 303 and the printer 304 have not connected to the digital camera 100 in the past; the details will be described later.

<Sequence of Operations in Processing for Connection Between Communication Apparatuses>

Figure 4:
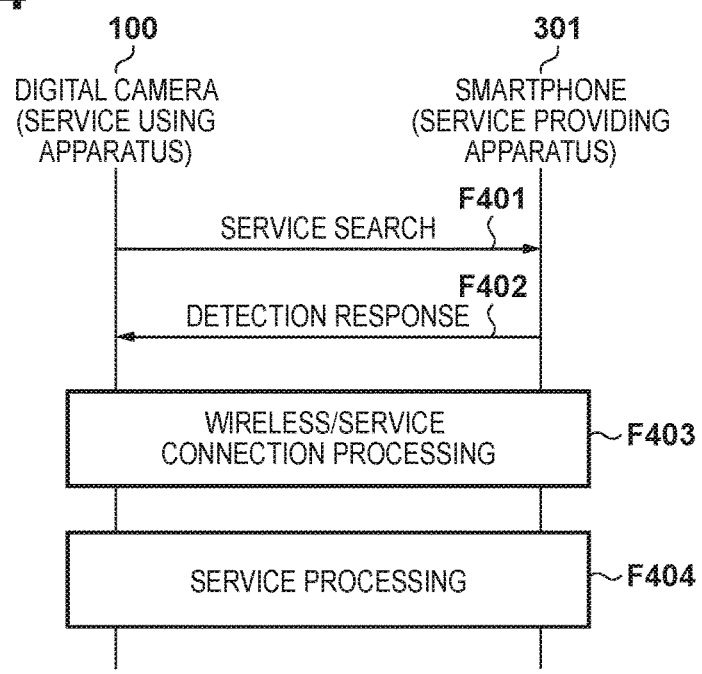
FIG. 4 shows an inter-apparatus sequence, from service search to service processing, according to the embodiment.

The following describes a sequence of operations pertaining to connection processing in the digital camera 100 with reference to FIG. 4. FIG. 4 shows an operational sequence between the digital camera 100 (a service using apparatus) and the smartphone 301 (a service providing apparatus).

In F401, the digital camera 100 transmits a service search signal to search for a predetermined service. The service search signal is a control signal for searching for communication apparatuses that provide the predetermined service; for example, an action frame that constitutes a management frame as defined by the aforementioned IEEE 802.11u is transmitted as the service search signal. This service search signal is transmitted by way of, for example, broadcasting whereby partner devices are not specified.

In F402, when the smartphone 301 has received the service search signal transmitted in F401, it transmits a detection response signal to the digital camera 100 if it provides the service designated by the service search signal.

In F403, if the digital camera 100 recognized that the smartphone 301 provides the predetermined service, it executes, for example, connection processing at wireless and service layers based on the aforementioned Wi-Fi Direct specification. That is to say, among the digital camera 100 and the smartphone 301, one operates as a GO, and the other operates as a CL and joins a wireless network constructed by the GO to establish connection at the wireless layer. The digital camera 100 and the smartphone 301 also execute a connection procedure at their respective, predetermined service levels that are defined on a service-by-service basis.

Note that the CL may not be the only participant in the wireless network; for example, the GO may be deemed a participant in the wireless network upon constructing the wireless network.

In F404, the digital camera 100 implements the service, for example, a file transfer service, between the digital camera 100 and the smartphone 301.

Note that in the present embodiment, as in F401 and F402, a communication apparatus that supports a desired service is discovered from among peripheral communication apparatuses using a service search signal or a similar control signal before a network is formed between communication apparatuses, and then connection processing is executed. Therefore, a communication apparatus that provides the desired service can be discovered without executing processing to connect to individual communication apparatuses; in other words, connection processing can be executed only with a necessary communication apparatus. This can reduce a period required for the overall operations, including connection processing, and realize the efficient use of network resources.

<Sequence of Operations Pertaining to Service Search Processing>

Figure 5:
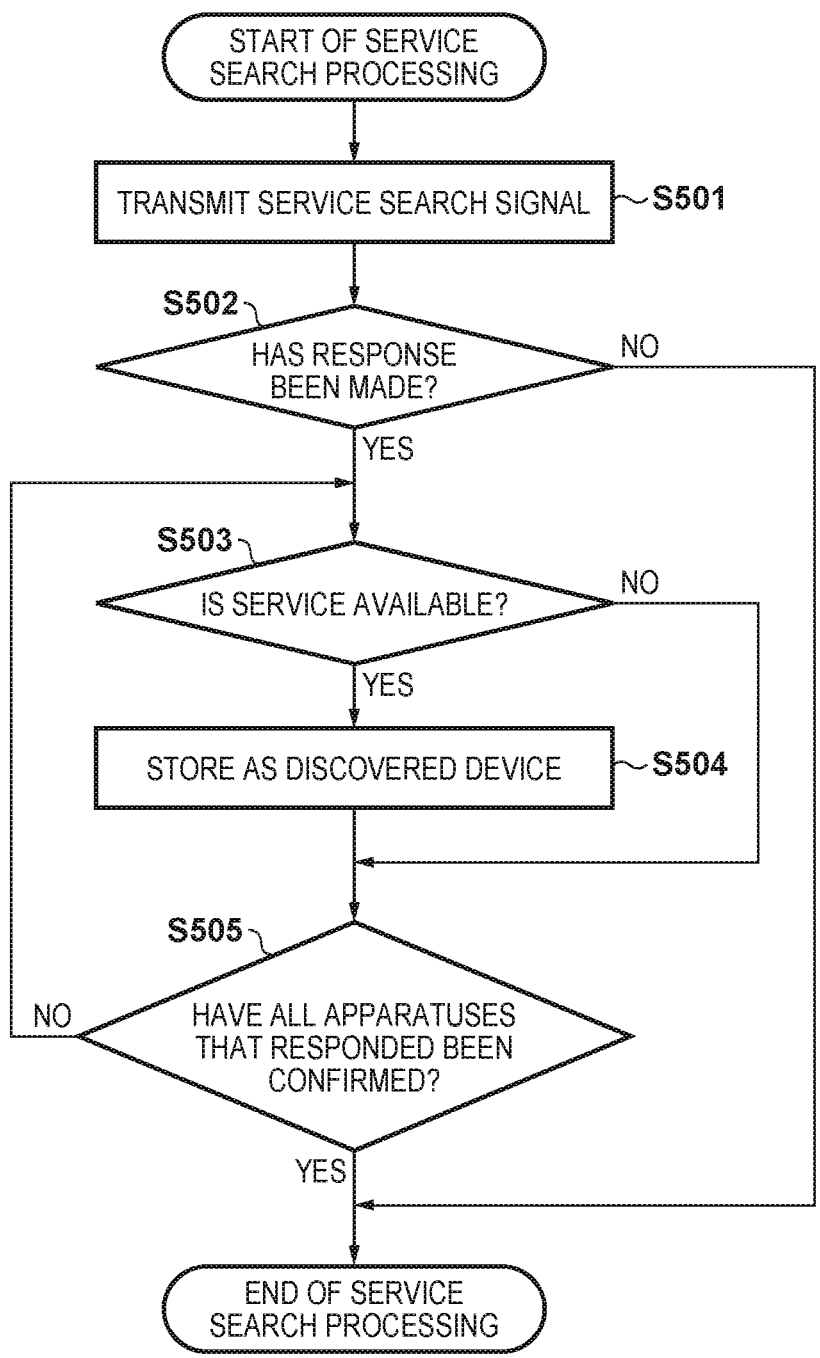
FIG. 5 is a flowchart of a sequence of operations in service search processing according to the embodiment.

The following describes a sequence of operations in service search processing (processing related to transmission of the service search signal in F401 and reception of the detection response signal in F402) with reference to FIG. 5. Note that the present processing is realized by the control unit 102 deploying a program stored in the ROM of the storage unit 103 to the RAM of the storage unit 103 and executing the deployed program.

In step S501, the control unit 102 transmits the aforementioned service search signal to communication apparatuses that are present in the communication range.

In step S502, the control unit 102 determines whether a communication apparatus has made a response to the service search signal transmitted in step S501. Specifically, the control unit 102 determines whether it has received a detection response signal from a communication apparatus in reply to the service search signal. If the control unit 102 has received the detection response signal shown in, for example, FIG. 4 via the wireless unit 104, it proceeds to step S503. On the other hand, if the control unit 102 has not received the detection response signal within a predetermined wait period, it determines that there is no communication apparatus that provides a desired service in the communication range, and ends the present sequence of operations.

In step S503, the control unit 102 determines whether the service is available by analyzing the content of the received detection response signal. For example, if the type of the detection response is an error response, the control unit 102 determines that the service is unavailable, and proceeds to step S505. On the other hand, if the type of the detection response indicates approval, the control unit 102 determines that the service is available, and proceeds to step S504.

In step S504, the control unit 102 stores the communication apparatus whose service was determined to be available in step S503 as a "discovered device." For example, the control unit 102 adds information for identifying the discovered device (e.g., a UUID or similar information for identifying that communication apparatus) to a list of devices stored in the storage unit 103.

In step S505, the control unit 102 determines whether it has confirmed detection responses received from all communication apparatuses that responded. If the control unit 102 has not confirmed the contents of the detection responses from all communication apparatuses that responded, it returns to step S503, and repeats the processes of steps S503 to S505 until it confirms the contents of the detection responses from all communication apparatuses that responded. Note that the wait period may continue until a predetermined timer reaches zero. On the other hand, if the control unit 102 has confirmed all of the detection responses from the communication apparatus that responded, it ends the sequence of operations pertaining to the present processing, and causes a return to a caller.

<Sequence of Operations Pertaining to Connection Processing>

Figure 6A:
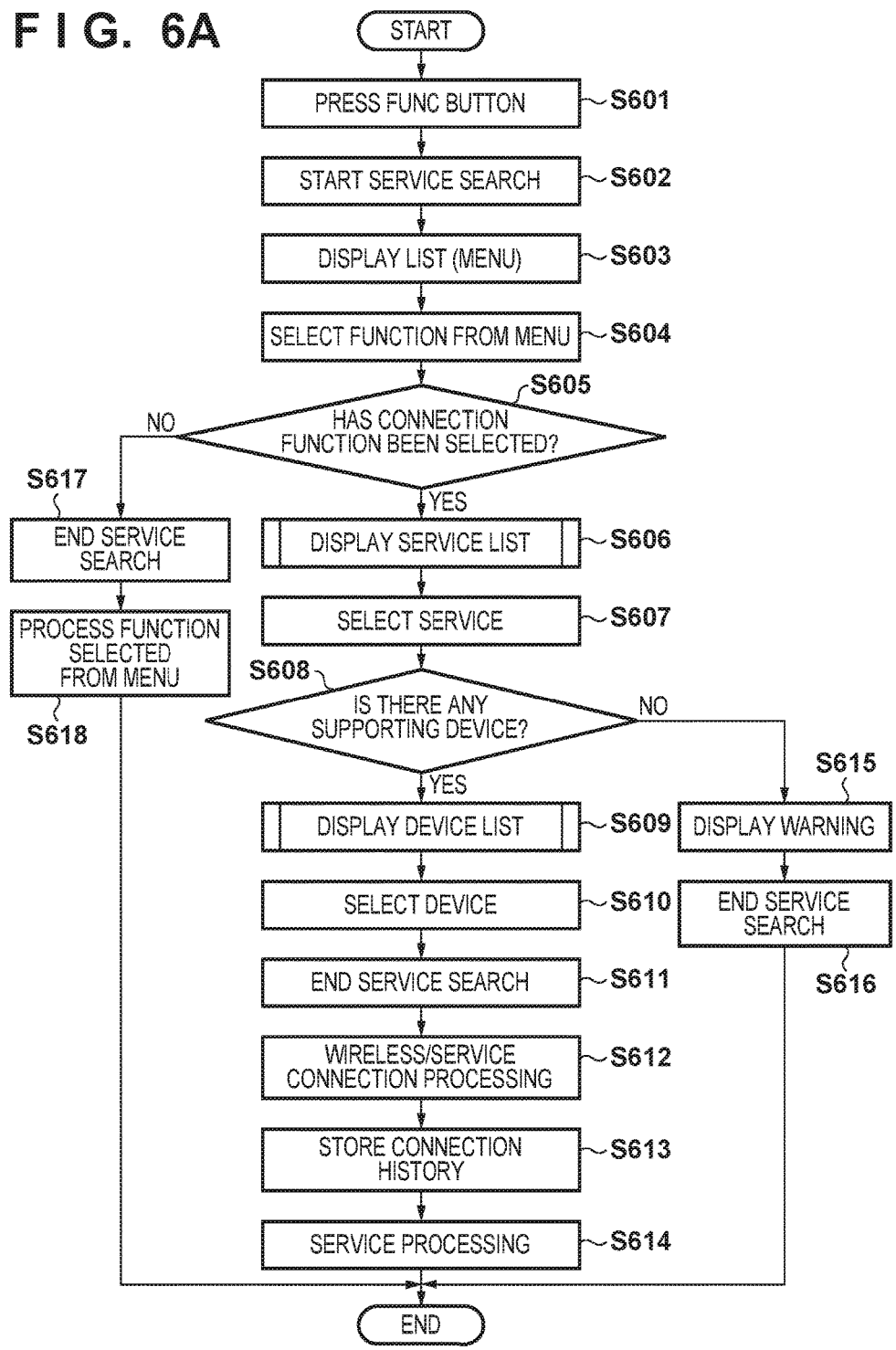
FIG. 6A is a flowchart of a sequence of operations in connection processing according to the embodiment.
Figure 6C:
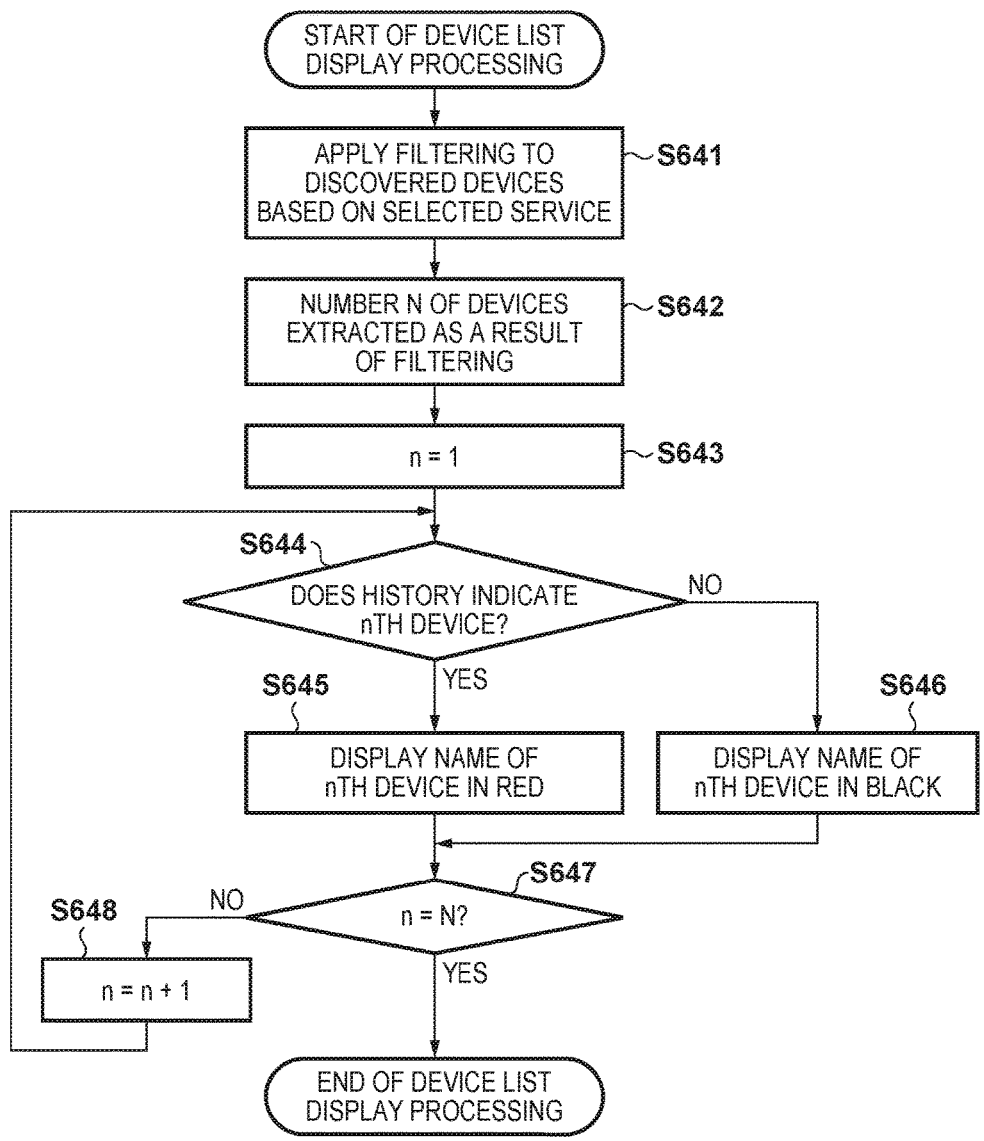
FIG. 6C is a flowchart of a sequence of operations pertaining to device list display processing according to the embodiment.

With reference to FIGS. 6A to 6C, the following describes processing sequences in which the digital camera 100 searches for the services provided by peripheral communication apparatuses and then connects to an external communication apparatus that provides a desired service. Screens displayed on the digital camera 100 in relation to this connection processing will also be described with reference to FIGS. 7A to 7G as appropriate.

First, the overall operations in connection processing executed by the digital camera 100 will be described with reference to FIG. 6A. Note that the present processing is started in a playback state (FIG. 7A) in which the control unit 102 displays, on the display unit 105, an image that has been captured using the service providing unit 106, which serves as the image capturing function of the digital camera 100. Also note that the present processing is realized by the control unit 102 deploying a program stored in the ROM of the storage unit 103 to the RAM of the storage unit 103 and executing the deployed program.

First, in step S601, the control unit 102 detects pressing of, for example, a FUNC button for starting a service search. For example, the console unit 109 notifies the control unit 102 of pressing of the FUNC button included in the console unit 109, and the control unit 102 detects pressing of the FUNC button by receiving the notification from the console unit 109.

In step S602, the control unit 102 starts the service search in response to detection of a user instruction with respect to the FUNC button. The control unit 102 transmits a service search signal to communication apparatuses in the communication range to proceed with the service search processing, which has been described earlier with reference to FIG. 5.

Figure 7A:
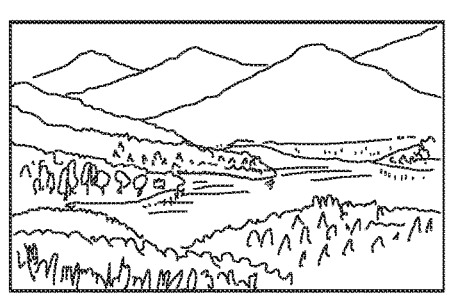
FIGS. 7A to 7G show examples of screens that are displayed during the connection processing according to the embodiment.
Figure 7B:
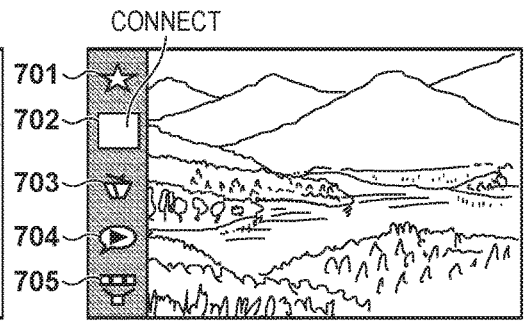

In step S603, the control unit 102 displays, on the display unit 105, a list (menu) of functions that can be executed on the digital camera 100. FIG. 7B shows an example of a screen with the menu displayed by the control unit 102 when the FUNC button has been pressed by the user. In the example of FIG. 7B, the menu shows function icons indicating the functions that can be executed on the digital camera 100. For example, from the top, the icons on the menu indicate favorite settings 701, connect 702, delete 703, suggested playback 704, and slide show 705; when the user selects a desired icon, the control unit 102 executes a corresponding function.

In step S604, the control unit 102 detects, via the console unit 109, the user's selection of a predetermined function from the menu displayed on the display unit 105. In step S605, the control unit 102 determines whether the function selected by the user in S604 is a connection function. For example, the control unit 102 uses information of the selected icon indicated by a notification from the console unit 109 as a basis for determining whether the connection function shown in FIG. 7B has been selected. If the control unit 102 determines that the connection function has been selected, it proceeds to step S606; if it determines that a function other than the connection function has been selected, it proceeds to step S617.

First, a description is given of a case in which a function other than the connection function has been selected in step S605. In step S617, the control unit 102 ends the service search started in step S602. Then, in step S618, the control unit 102 executes processing corresponding to the function that was selected by the user in step S604, and ends the present processing sequence. Once the present processing sequence has been ended, the digital camera 100 returns to the screen shown in FIG. 7A.

<Sequence of Operations Pertaining to Service List Display Processing>

Next, a description is given of a case in which the connection function has been selected in step S605. In step S606, the control unit 102 displays a service list on the display unit 105 based on services and communication apparatuses that were discovered through the service search started in step S602.

The following describes a sequence of operations pertaining to display of the service list with reference to FIG. 6B, and how the service list is displayed with reference to FIGS. 7A to 7G as appropriate.

First, in step S621, the control unit 102 stores the number of services supported by the digital camera 100 as a variable N prepared in the RAM of the storage unit 103. In the present embodiment, it will be assumed that the digital camera 100 supports, for example, a file transfer service for transferring files of images and the like, a video output service for outputting videos to a television or a similar display, and a print service for transmitting images to the printer 304 and printing the images. Therefore, the number of services supported by the digital camera 100 is three.

In step S622, the control unit 102 prepares a variable n indicating a service targeted for processing in the RAM of the storage unit 103, and stores one as the variable n. In step S623, the control unit 102 determines whether the $n^{th}$ service (that is to say, one of the aforementioned three services) is included among the services and the communication apparatuses that were discovered through the service search started in step S602. If the control unit 102 determines that the $n^{th}$ service is included, it proceeds to step S624; if it determines that the $n^{th}$ service is not included, it proceeds to step S627.

In step S624, the control unit 102 determines whether connection has been established in the past with one or more communication apparatuses that support the $n^{th}$ service (that is to say, discovered devices). For example, the control unit 102 reads out identification information for identifying communication apparatuses with which connection has been established in the past (UUIDs or similar information for identifying the communication apparatuses) from history information stored in the ROM of the storage unit 103, and compares the identification information with information for identifying the communication apparatuses targeted for processing. If the control unit 102 determines that connection has been established in the past with one or more of the communication apparatuses that support the $n^{th}$ service based on the history information, it proceeds to step S625; if it determines that connection has not been established with any of them in the past, it proceeds to step S626.

In step S625, as one or more of the discovered devices match the past connection history, for example, the control unit 102 displays an icon corresponding to the $n^{th}$ service in red on the display unit 105. In step S626, as none of the discovered devices matches the past connection history, the control unit 102 displays the icon corresponding to the $n^{th}$ service in white on the display unit 105. In step S627, due to the failure to discover a communication apparatus that supports the $n^{th}$ service, the control unit 102 displays the icon corresponding to the $n^{th}$ service in gray on the display unit 105.

In step S628, the control unit 102 compares the variable n with the number of supported services N, and determines whether they match. If the variable n and the number of supported services N match, the control unit 102 ends the sequence of operations pertaining to service list display processing, and causes a return to a caller. On the other hand, if the variable n and the number of supported services N do not match, step S629 follows. In step S629, the control unit 102 increments the variable n, returns to step S623, and repeats the processes of steps S623 to S628 until the variable n matches the number of supported services N.

Figure 7C:
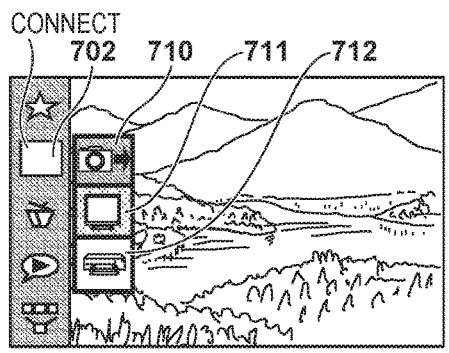

With reference to FIG. 7C, the foregoing service list display processing will now be described based on the exemplary network configuration shown in FIG. 3. FIG. 7C shows an example of a screen with the service list displayed by the control unit 102 after selection of the connection function. In FIG. 7C, three icons indicating the services are displayed next to an icon indicating the connection function (that is to say, connect 702); specifically, from the top, the three icons respectively indicate a file transfer service 710, a video output service 711, and a print service 712. Referring to the exemplary network configuration shown in FIG. 3, in the communication range of the digital camera 100, there are three communication apparatuses supporting the file transfer service (that is to say, the smartphones 301, 302, and 303). There is only one communication apparatus supporting the print service (that is to say, the printer 304). The smartphones 301 and 302 have connected to the digital camera 100 in the past, and therefore their history information is stored in the storage unit 103. Accordingly, in the service list display processing shown in FIG. 6B, the control unit 102 displays the file transfer service 710 in red to indicate the existence of the service and the existence of apparatuses with which connection has been established in the past. Also, the control unit 102 displays the video output service 711 in gray to indicate that the service does not exist, and displays the print service 712 in white to indicate that the service exists but there is no apparatus with which connection has been established in the past.

Referring back to FIG. 6A, a description is now given of the processes from step S607.

In step S607, the control unit 102 detects, via the console unit 109, a predetermined service that the user selected from the service list displayed in step S606.

In step S608, the control unit 102 determines whether the service search started in step S602 has discovered one or more communication apparatuses supporting the service selected by the user in step S607. If the control unit 102 determines that the service search has discovered one or more communication apparatuses supporting the selected service, it proceeds to step S609; if it determines that the service search has not discovered any communication apparatus supporting the selected service, it proceeds to step S615.

First, a description is given of a case in which the control unit 102 determines in step S608 that the service search has discovered one or more communication apparatuses supporting the selected service.

In step S609, the control unit 102 displays a list of communication apparatuses supporting the service selected by the user (a device list) on the display unit 105. The following describes device list display processing in detail with reference to FIGS. 3, 6C, and 7A to 7G.

<Sequence of Operations Pertaining to Device List Display Processing>

FIG. 6C shows a sequence of operations pertaining to the device list display processing. In step S641, based on the service selected by the user in step S607, the control unit 102 applies filtering to the communication apparatuses that were discovered through the service search started in step S602. For example, in a case where the user has selected the file transfer service, the smartphones 301, 302, and 303 are extracted as a result of filtering in the exemplary network configuration shown in FIG. 3.

In step S642, the control unit 102 stores the number of apparatuses extracted as a result of filtering in step S641 as a variable N prepared in the RAM of the storage unit 103. In the aforementioned example, three is stored as the variable N. Furthermore, in step S643, the control unit 102 stores one—a default value—as a variable n prepared in the RAM of the storage unit 103.

In step S644, the control unit 102 determines whether the $n^{th}$ apparatus among the communication apparatuses extracted as a result of filtering in step S641 is included in a list of communication apparatuses with which connection has been established in the past; note that this list is stored in the ROM of the storage unit 103. If the control unit 102 determines that connection has been established with the $n^{th}$ communication apparatus in the past, it proceeds to step S645. On the other hand, if it determines that connection has not been established with the $n^{th}$ communication apparatus in the past, it proceeds to step S646.

In step S645, the control unit 102 displays a name (device name) of the $n^{th}$ communication apparatus, with which connection has been established in the past, in red on the display unit 105. On the other hand, in step S646, the control unit 102 displays the device name of the $n^{th}$ communication apparatus in black on the display unit 105.

Thereafter, in step S647, the control unit 102 determines whether the variable n and the number of devices N match; if it determines that the variable n and the number of devices N match, it ends the sequence of operations pertaining to the device list display processing, and causes a return to a caller. On the other hand, if it determines that the variable n and the number of devices N do not match, it proceeds to step S648, increments the variable n, and returns to step S644. Thereafter, the control unit 102 repeats the processes of steps S644 to S647 until the variable n and the number of devices N match.

Figure 7D:
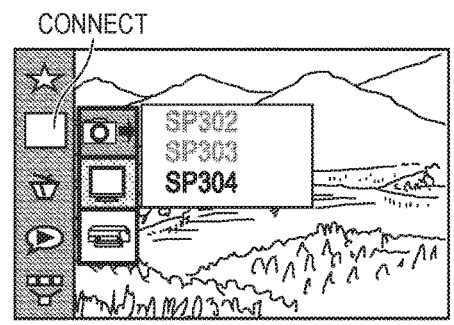
Figure 7E:
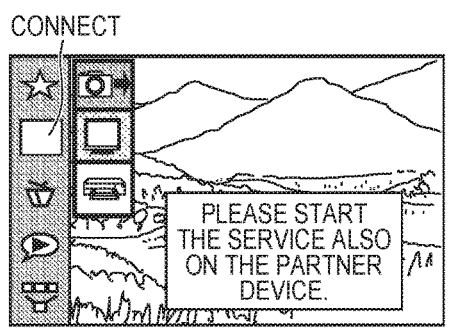

With reference to FIG. 7D, the foregoing service list display will now be described based on the exemplary network configuration shown in FIG. 3. FIG. 7D shows an example of a screen with the device list displayed when the file transfer service has been selected. In FIG. 7D, three device names are displayed next to the file transfer service selected by the user. Specifically, from the top, "SP302," "SP303," and "SP304" respectively correspond to the smartphones 301, 302, and 303. In the exemplary network configuration shown in FIG. 3, the smartphones 301, 302, and 303 are communication apparatuses supporting the file transfer service, and among these, the smartphones 301 and 302 are communication apparatuses with which connection has been established in the past. Therefore, in the example of FIG. 7D, the device names of the devices with which connection has been established in the past (that is to say, "SP302" and "SP303") are displayed in red, whereas the device name of the device with which connection has not been established in the past (that is to say, "SP304") is displayed in black, through the device list display processing shown in FIG. 6C.

Referring back to FIG. 6A, a description is now given of the processes from step S610.

In step S610, the control unit 102 detects, via the console unit 109, an apparatus selected by the user from the device list displayed in step S609.

The control unit 102 ends the service search, which was started in step S602, in step S611, and then executes wireless connection processing and service connection processing in step S612. Note that the wireless connection processing and the service connection processing correspond to the processing in F403, which has been described earlier with reference to FIG. 4.

In step S613, the control unit 102 stores information of the communication apparatus with which connection has been established in the present processing to the storage unit 103. The information of this communication apparatus stored here is, for example, UUID or similar information for identifying this communication apparatus. The information for identifying this communication apparatus may be stored in association with the corresponding service (a service name, a service identifier, etc.). Note that information of communication apparatuses with which connection has already been established in the past may not be stored, unless the information at present has changed from the past.

In step S614, the control unit 102 executes processing corresponding to the service for which the connection processing has been executed. In the foregoing example in which the file transfer service has been selected, this processing corresponding to the service is, for example, processing for transmitting images to the communication apparatus serving as a connection partner. Thereafter, the control unit 102 ends the sequence of operations pertaining to the connection processing.

The following describes a case in which the control unit 102 determines in step S608 that there is no communication apparatus supporting the selected service.

In step S615, the control unit 102 displays a warning indicating that there is no communication apparatus supporting the selected service on the display unit 105. The warning displayed in the present embodiment will now be described in detail with reference to FIGS. 3 and 7A to 7G.

In the aforementioned exemplary network configuration shown in FIG. 3, there is no communication apparatus supporting the video output service in the communication range of the digital camera 100. In this case, if the user selects the icon indicating the video output service 711 in FIG. 7C, the control unit 102 displays a warning shown in FIG. 7E, that is to say, a warning indicating that the selected service does not exist. The user may be notified of a warning that reads, for example, "please start the service also on the partner device" as shown in a display example of FIG. 7E.

In step S616, the control unit 102 ends the service search started in S602, and ends the connection processing sequence.

Although one communication apparatus provides one service in the description of the present embodiment, the present embodiment is also applicable to a case in which one communication apparatus provides multiple services. For example, in the network configuration shown in FIG. 3, the smartphone 301 may provide the file transfer service and the video output service. The present embodiment can also be implemented in this case. That is to say, as the service list and the device list display all services found through the search, even when a specific communication apparatus provides multiple services, the service list displays each of the multiple services in relation to the communication apparatus. Furthermore, in the process for displaying device names upon selection of a predetermined service, each of the multiple services provided can be displayed together with a device name(s). In the case of a communication apparatus that provides multiple services with different connection histories, all of the services provided by this communication apparatus may be displayed as services provided by an apparatus with which connection has been established in the past. As stated earlier, in the process for storing the connection history in step S613, information for identifying a communication apparatus may be stored in association with information for identifying a corresponding service(s). Therefore, even in the case of a communication apparatus that provides multiple services with different connection histories, display of the service list and the device list can be controlled in accordance with a usage pattern of the user. For example, in a case where the file transfer service of the smartphone 301 has been used but the video output service thereof has not been used, the displayed service list shows only the icon indicating the file transfer service in red, and shows the icon indicating the video output service in white. Similarly, the displayed device list shows a device name in red only when the file transfer service has been selected, and shows the device name in black when the video output service has been selected.

Figure 7F:
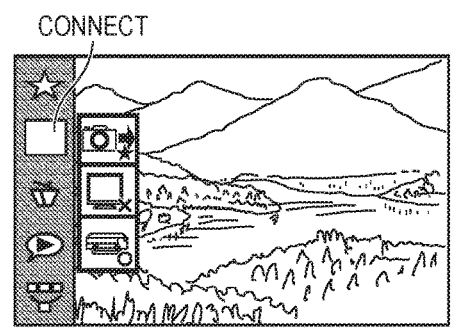

In the aforementioned service list display processing shown in FIG. 6B, the colors of icons indicating the states of provided services are controlled in accordance with the provided services and connection history. However, the states of the provided services are not limited to being displayed in such display appearances, and may be displayed in other display appearances. For example, as shown in FIG. 7F, the states may be indicated by separate icons displayed next to service icons. In the example of FIG. 7F, a star-shaped icon is displayed when a service is provided by one or more communication apparatuses and connection has been established with at least one of the communication apparatuses. A circular icon is displayed when a service is provided by one or more communication apparatuses but connection has not been established with any of the communication apparatuses. A cross-shaped icon is displayed at the lower right corner of a service icon when there is no communication apparatus that provides the service. The foregoing display appearances also enable the user to easily grasp the states of the services.

Figure 7G:
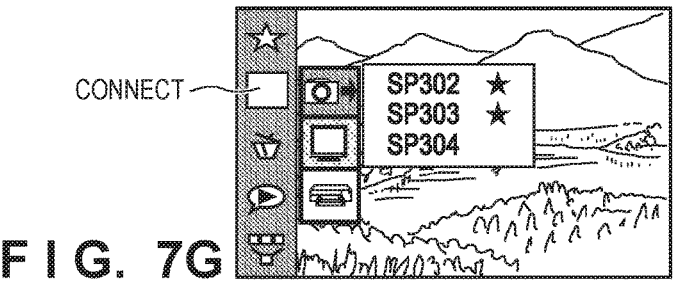

In the aforementioned device list display processing shown in FIG. 6C, a device name of a device with which connection has been established in the past is displayed in red, whereas a device name of a device with which connection has not been established in the past is displayed in black. However, device names are not limited to being displayed in such display appearances, and may be displayed in other display appearances. For example, as shown in FIG. 7G, an icon indicating that connection has been established in the past may be displayed next to a device name. In the example of FIG. 7G, a star-shaped icon indicating that connection has been established in the past is displayed next to device names "SP302" and "SP303" of devices with which connection has been established in the past. Furthermore, device names may be displayed in order such that device names of devices with which connection has been established in the past are assigned preferential display orders; for example, device names of devices with which connection was established recently may be displayed in order from the top of the list. In this way, the user can more easily select a communication apparatus with which connection was established recently.

As described above, in the present embodiment, services provided by external communication apparatuses are searched for, and these services are displayed in the service list, which is used in selecting a service, in different display appearances based on the search result and the past connection history. In this way, an apparatus that provides a desired service can be easily selected in accordance with a usage pattern of the user. That is to say, in a case where one or more communication apparatuses are stored in the past connection history, the existence of a communication apparatus that has been used before and provides a desired service can be grasped in the process for displaying the service list, which is used in selecting a service. It is also possible to easily grasp what kind of other services are provided, in addition to the desired services, by apparatuses located in the communication range.

Furthermore, in the present embodiment, when the device list is displayed to enable the user to select a communication apparatus, an apparatus with which connection has been established in the past is displayed in a different display appearance (using a different color or mark). This enables the user to preferentially select an apparatus that has been used in the past by establishing connection therewith, that is to say, to easily select an apparatus serving as a connection partner.

Moreover, in the present embodiment, when the user has selected a service that is not provided by peripheral communication apparatuses from the displayed service list, for example, a warning message indicating that the service should be started on a communication apparatus is displayed. In this way, the user can easily grasp what he/she should do to use a desired service.

There may be cases in which a communication apparatus stored in the history as an apparatus that provided a predetermined service in the past does not currently provide the predetermined service. In such cases, the present embodiment displays the service list or the device list in consideration of services that are currently provided, and thus enables the user to intuitively grasp the fact that the predetermined service is not provided at present.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-182223, filed Sep. 15, 2015, which is hereby incorporated by reference herein in its entirety.

What is claimed is:

1. A communication apparatus comprising:
    a communication unit configured to communicate with external communication apparatuses;
    a storage unit configured to store history information related to one or more external communication apparatuses with which connection has been established in the past; and
    a display control unit configured to, before allowing a user to select an external communication apparatus to serve as a connection partner, display a plurality of candidates for services that the communication apparatus utilizes so as to be selectable by the user,
    wherein the communication unit receives provided service information that relates to the services provided by the external communication apparatuses in response to a service search signal, and
    based on the received provided service information and on the stored history information, the display control unit changes a display appearance used in displaying the plurality of candidates for services for each candidate.

2. The apparatus according to claim 1,
    wherein, in displaying the plurality of candidates for services, the display control unit displays information indicating the service that is provided by an external communication apparatus with which connection has been established in the past and information indicating the service that is provided by an external communication apparatus with which connection has not been established in the past, with different display appearances.

3. The apparatus according to claim 1,
    wherein, in response to a user instruction for selecting a service that the apparatus utilizes from among the plurality of candidates for services, the display control unit displays information indicating the external communication apparatus that provides the selected service, and
    the display control unit displays the information indicating the external communication apparatus that provides the selected service in different display appearances between when connection has been established with the external communication apparatus in the past and when connection has not been established with the external communication apparatus in the past.

4. The apparatus according to claim 1,
    wherein the storage unit stores, in the history information, an identifier of an external communication apparatus with which connection has been established in the past and an identifier of a service provided during the past period when the apparatus established a connection to the external communication apparatus, in association with each other.

5. The apparatus according to claim 1,
    wherein, when the display control unit further displays information indicating a service that is not provided by the external communication apparatuses, the display control unit displays a warning in response to a user instruction for the service that is not provided by the external communication apparatuses.

6. The apparatus according to claim 1,
    wherein, before forming a network with external communication apparatuses, the communication unit transmits a control signal for searching for the provided service information to the external communication apparatuses, and receives the provided service information.

7. The apparatus according to claim 6,
    wherein when a user instruction for selecting an external communication apparatus that serves as a connection partner has been issued via the display that allows the user to select an external communication apparatus that serves as a connection partner, the communication unit forms a network with the selected external communication apparatus.

8. The apparatus according to claim 6,
    wherein the communication unit forms a network with one of the connected communication apparatuses operating as an access point.

9. The apparatus according to claim 6,
    wherein the communication unit transmits the control signal in response to a user instruction for implementing the display that allows the user to select an external communication apparatus that serves as a connection partner.

10. The apparatus according to claim 1,
    wherein the service is provided at an application layer by the external communication apparatus.

11. The apparatus according to claim 1,
    wherein the apparatus is a mobile phone device.

12. The apparatus according to claim 1,
    wherein the apparatus is a tablet terminal.

13. The apparatus according to claim 1,
    wherein the apparatus is a vehicle-mounted device.

14. A control method of a communication apparatus, the control method comprising:
    communicating with external communication apparatuses;
    storing history information related to one or more external communication apparatuses with which connection has been established in the past; and
    before allowing a user to select an external communication apparatus to serve as a connection partner, displaying a plurality of candidates for services that the communication apparatus utilizes so as to be selectable by the user,
    wherein
    in the communicating, provided service information that relates to the services provided by the external communication apparatuses is searched, and
    in the displaying, based on the provided service information obtained by the search and on the stored history information, a display appearance used in displaying the plurality of candidates for services for each candidate is changed.

15. A non-transitory computer-readable storage medium storing a computer program, for causing a computer to function as a communication processing apparatus, the computer program comprising:
- a code to cause a communication unit to communicate with external communication apparatuses,
- a code to cause a storage unit to store history information related to one or more external communication apparatuses with which connection has been established in the past; and
- a code to cause a display control unit to, before allowing a user to select an external communication apparatus to serve as a connection partner, display a plurality of candidates for services that the communication apparatus utilizes so as to be selectable by the user, wherein
- the program includes code to cause the communication unit to search for provided service information that relates to the services provided by the external communication apparatuses, and
- based on the provided service information obtained by the search and on the stored history information, the code to cause the display control unit to display causes the display control unit to change a display appearance used in displaying the plurality of candidates for services for each candidate.

16. A communication apparatus comprising:
- a communication unit configured to communicate with external communication apparatuses;
- a storage unit configured to store history information related to one or more external communication apparatuses with which connection has been established in the past; and
- a display control unit configured to display a service menu including a plurality of candidates for services that the communication apparatus utilizes so as to be selectable by the user,
- wherein the communication unit receives service information related to services provided by the external communication apparatuses in response to a service search signal, and
- wherein the display control unit changes individually a display appearance of the plurality of candidates for services in the service menu based on the received service information and the stored history information.

17. The apparatus according to claim 16,
- wherein, in displaying the plurality of candidates for services, the display control unit displays information indicating the service that is provided by an external communication apparatus with which connection has been established in the past and information indicating the service that is provided by an external communication apparatus with which connection has not been established in the past, with different display appearances.

18. The apparatus according to claim 16,
- wherein the display control unit configured to display the service menu including a plurality of icons that indicate the plurality of candidates for services that the communication apparatus utilizes.

19. The apparatus according to claim 18,
- wherein the display control unit configured to change color of the plurality of icons in the service menu based on the received service information and the stored history information.

* * * * *